(12) United States Patent
Koo

(10) Patent No.: US 9,669,814 B2
(45) Date of Patent: Jun. 6, 2017

(54) SUB MASTER CYLINDER AND BRAKE APPARATUS HAVING THE SAME

(75) Inventor: Chang Hoe Koo, Incheon (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 682 days.

(21) Appl. No.: 13/421,282

(22) Filed: Mar. 15, 2012

(65) Prior Publication Data

US 2013/0074491 A1 Mar. 28, 2013

(30) Foreign Application Priority Data

Sep. 26, 2011 (KR) .................. 10-2011-0097116

(51) Int. Cl.
*F15B 7/08* (2006.01)
*B60T 8/40* (2006.01)
*B60T 13/74* (2006.01)
*B60T 8/38* (2006.01)

(52) U.S. Cl.
CPC .............. *B60T 8/4077* (2013.01); *B60T 8/38* (2013.01); *B60T 13/745* (2013.01); *F15B 7/08* (2013.01)

(58) Field of Classification Search
CPC ........ B60T 11/236; B60T 8/4077; B60T 8/38; B60T 13/745
USPC ......................................... 60/545, 588, 586
See application file for complete search history.

(56) References Cited

U.S. PATENT DOCUMENTS 4,678,243 A * 7/1987 Leiber ........................ 303/113.4
2003/0029166 A1 * 2/2003 Hashida ........................ 60/562

FOREIGN PATENT DOCUMENTS

JP 2009179260 A 8/2009
KR 100636360 B1 10/2006

OTHER PUBLICATIONS

Office Action dated Dec. 27, 2012 in Korean Application No. 10-2011-0097116.

* cited by examiner

*Primary Examiner* — Eric Keasel
*Assistant Examiner* — Abiy Teka
(74) *Attorney, Agent, or Firm* — Saliwanchik, Lloyd & Eisenschenk

(57) ABSTRACT

A sub master cylinder includes a body formed with a chamber in which oil is stored; a first sub piston having one end which is secured to one end of the body and the other end which extends toward the other end of the body and is disposed to cross the chamber; and a second sub piston disposed between an inner surface of the body and an outer surface of the first sub piston to be moved in the chamber.

6 Claims, 20 Drawing Sheets

SUB MASTER CYLINDER AND BRAKE APPARATUS HAVING THE SAME

CROSS-REFERENCE TO RELATED APPLICATION

This application claims the benefit under 35 U.S.C. 119 of Korean Patent Application No. 10-2011-0097116, filed Sep. 26, 2011, which is hereby incorporated by reference in its entirety.

BACKGROUND

Exemplary embodiments of the present invention relate to a sub master cylinder and a brake apparatus having the same, and more particularly, to a sub master cylinder which can reduce a pressure acting area in a master cylinder to decrease a driver's pedal actuation force while providing a braking force equal to or increased in comparison with the conventional art, and a brake apparatus having the same.

In general, a brake apparatus of a vehicle indicates a device for decelerating the speed of or stopping a traveling vehicle.

The brake apparatus operates in such a way as to perform a braking function through converting the kinetic energy of a vehicle into thermal energy by using a frictional force generated by a driver's actuation force or by auxiliary power.

In a passenger car, a hydraulic type brake apparatus is generally adopted. In this type, the driver's pedal stepping force is converted, by way of a hydraulic pressure as an intermediate medium, into the braking force of wheels.

A background art related with the present invention is disclosed in Korean Unexamined Patent Publication No. 10-2010-0005919 (entitled "Master Cylinder").

In a brake apparatus, a clamping force Fclamp can be calculated by the following equation.

$$F_{clamp} = F_{pedal} \times \text{Pedal Ratio} \times \frac{A_{caliper}}{A_{M/cyl.}}$$

In the conventional art, in order to decrease a driver's pedal actuation force Fpedal in the state in which the braking force of the brake apparatus is maintained, that is, the clamping force Fclamp is maintained, a Pedal Ratio has been increased or a caliper size Acaliper has been enlarged.

However, in the case where the Pedal Ratio is increased, the load applied to a pedal bracket increases and the pedal bracket is likely to be deformed by a moment. Also, in the case where the caliper size Acaliper is enlarged, the manufacturing cost is likely to be increased due to an increase in weight.

Therefore, it is required to solve these problems.

BRIEF SUMMARY

An embodiment of the present invention relates to a sub master cylinder which can reduce a pressure acting area in a master cylinder AM/cyl. to decrease a driver's pedal actuation force while providing a braking force equal to or increased in comparison with the conventional art, and a brake apparatus having the same.

In one embodiment, a sub master cylinder includes: a body formed with a chamber in which oil is stored; a first sub piston having one end which is secured to one end of the body and the other end which extends toward the other end of the body and is disposed to cross the chamber; and a second sub piston disposed between an inner surface of the body and an outer surface of the first sub piston to be moved in the chamber.

Preferably, the second sub piston is formed into a hollow cylindrical shape, a first cup groove, in which a first seal cup is received, is defined on the inner surface of the body, a second cup groove, in which a second seal cup is received, is defined on the outer surface of the first sub piston, and, in a state in which the first seal cup is brought into close contact with an outer surface of the second sub piston and the second seal cup is brought into close contact with an inner surface of the second sub piston, the second sub piston is moved in the chamber.

More preferably, the first sub piston includes: a first cylindrical part having one end which is secured to the one end of the body and the other end which is disposed to pass through the chamber; and a first disc part projecting radially outward at the other end of the first cylindrical part, wherein the second cup groove is defined at a place where the first cylindrical part and the first disc part are connected with each other.

More preferably, the sub master cylinder further includes an elastic member having one end which is secured to the first disc part and the other end which elastically supports the second sub piston to return the second sub piston to a standby position when a force stepping a pedal is removed.

Preferably, the second sub piston is formed into a hollow cylindrical shape, a first cup groove, in which a first seal cup is received, is defined on the inner surface of the body, a second cup groove, in which a second seal cup is received, is defined on an inner surface of the second sub piston, and, in a state in which the first seal cup is brought into close contact with an outer surface of the second sub piston and the second seal cup is brought into close contact with the outer surface of the first sub piston, the second sub piston is moved in the chamber.

More preferably, the first sub piston has the one end which is secured to the one end of the body and the other end which is formed into a cylindrical shape to pass through the chamber, and a pair of projections are formed on the inner surface of the second sub piston to project toward the first sub piston, and define the second cup groove.

Preferably, the second sub piston is formed into a hollow cylindrical shape, a first cup groove, in which a first seal cup is received, is defined on an outer surface of the second sub piston, a second cup groove, in which a second seal cup is received, is defined on an inner surface of the second sub piston, and, in a state in which the first seal cup is brought into close contact with the inner surface of the body defining the chamber and the second seal cup is brought into close contact with the outer surface of the first sub piston, the second sub piston is moved in the chamber.

More preferably, the first sub piston has the one end which is secured to the one end of the body and the other end which is formed into a cylindrical shape to pass through the chamber, a pair of outside projections are formed on the outer surface of the second sub piston to project toward the inner surface of the body, and define the first cup groove, and a pair of inside projections are formed on the inner surface of the second sub piston to project toward the first sub piston, and define the second cup groove.

Preferably, the second sub piston is formed into a hollow cylindrical shape, a first cup groove, in which a first seal cup is received, is defined on an outer surface of the second sub piston, a second cup groove, in which a second seal cup is received, is defined on the outer surface of the first sub piston, and, in a state in which the first seal cup is brought into close contact with the inner surface of the body defining the chamber and the second seal cup is brought into close contact with an inner surface of the second sub piston, the second sub piston is moved in the chamber.

More preferably, a pair of outside projections is formed on the outer surface of the second sub piston to project toward the inner surface of the body, and define the first cup groove. More preferably, the first sub piston includes: a first cylindrical part having one end which is secured to the one end of the body and the other end which is disposed to cross the chamber; and a first disc part projecting radially outward at the other end of the first cylindrical part, wherein the second cup groove is defined at a place where the first cylindrical part and the first disc part are connected with each other.

In another embodiment, a sub master cylinder includes: a body formed with a chamber in which oil is stored; and a sub piston disposed in the body to cross the chamber and be moved in the chamber, the sub piston including a first cylindrical part formed into a cylindrical shape; and a second cylindrical part connected with the other end of the first cylindrical part and having a diameter larger than the first cylindrical part.

Preferably, a step portion is formed at a place where the first cylindrical part and the second cylindrical part are connected with each other, a first cup groove, in which a first seal cup is received, is defined on an inner surface of the body, and a second cup groove, in which a second seal cup is received, is defined on the inner surface of the body to be separated from the first cup groove, and, in a state in which the first seal cup is brought into close contact with an outer surface of the second cylindrical part and the second seal cup is brought into close contact with an outer surface of the first cylindrical part, the sub piston is moved in the chamber.

More preferably, the sub master cylinder further includes an elastic member having one end which is secured to one end of the body and the other end which elastically supports the sub piston to return the sub piston to a standby position when a force stepping a pedal is removed.

Preferably, a first cup groove, in which a first seal cup is received, is defined on an outer surface of the sub piston at a place where the first cylindrical part and the second cylindrical part are connected with each other, a second cup groove, in which a second seal cup is received, is defined on an inner surface of the body, and, in a state in which the first seal cup is brought into close contact with the inner surface of the body defining the chamber and the second seal cup is brought into close contact with an outer surface of the first cylindrical part, the sub piston is moved in the chamber.

Preferably, a first cup groove, in which a first seal cup is received, is defined on an outer surface of the sub piston at a place where the first cylindrical part and the second cylindrical part are connected with each other, a second cup groove, in which a second seal cup is received, is defined on an outer surface of the first cylindrical part, and, in a state in which the first seal cup is brought into close contact with an inner surface of the body defining the chamber and the second seal cup is brought into close contact with the inner surface of the body, the sub piston is moved in the chamber.

Preferably, a first cup groove, in which a first seal cup is received, is defined on an inner surface of the body, a second cup groove, in which a second seal cup is received, is defined on an outer surface of the first cylindrical part, and, in a state in which the first seal cup is brought into close contact with an outer surface of the second cylindrical part and the second seal cup is brought into close contact with the inner surface of the body, the sub piston is moved in the chamber.

In another embodiment, a brake apparatus includes: a sub master cylinder including a body formed with a chamber in which oil is stored, a first sub piston having one end which is secured to one end of the body and the other end which extends toward the other end of the body and is disposed to cross the chamber, and a second sub piston disposed between an inner surface of the body and an outer surface of the first sub piston to be moved in the chamber; a master cylinder in which a first piston and a second piston are connected in series, wherein, in order to brake wheels, a hydraulic pressure is generated as the first piston is moved, and a hydraulic pressure is generated as the second piston is moved by movement of the first piston or a hydraulic pressure is generated as the second piston is moved by a hydraulic pressure transmitted through a first hydraulic line; and a hydraulic pressure diversion member configured to divert flow of a hydraulic pressure from the sub master cylinder to a pedal simulator or to the hydraulic line which is connected to the master cylinder.

In another embodiment, a brake apparatus includes: a sub master cylinder including a body formed with a chamber in which oil is stored, and a sub piston disposed in the body to cross the chamber and be moved in the chamber, the sub piston including a first cylindrical part formed into a cylindrical shape, and a second cylindrical part connected with the other end of the first cylindrical part and having a diameter larger than the first cylindrical part; a master cylinder in which a first piston and a second piston are connected in series, wherein, in order to brake wheels, a hydraulic pressure is generated as the first piston is moved, and a hydraulic pressure is generated as the second piston is moved by movement of the first piston or a hydraulic pressure is generated as the second piston is moved by a hydraulic pressure transmitted through a first hydraulic line; and a hydraulic pressure diversion member configured to divert flow of a hydraulic pressure from the sub master cylinder to a pedal simulator or to the hydraulic line which is connected to the master cylinder.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION

Figure 1:
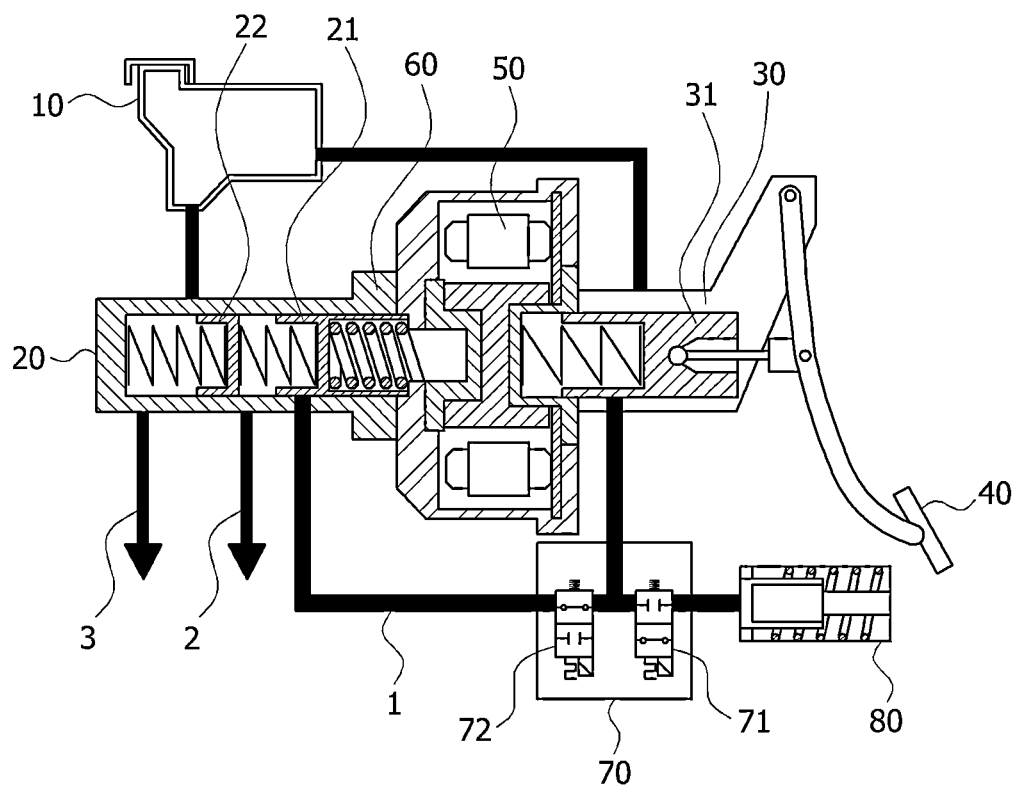
FIG. 1 is a cross-sectional view illustrating the construction of a brake apparatus in accordance with an embodiment of the present invention.

Hereinafter, a sub master cylinder and a brake apparatus having the same according to embodiments of the present invention will be described with reference to accompanying drawings. However, the embodiments are for illustrative purposes only and are not intended to limit the scope of the invention.

It is to be understood herein that embodiments of the present invention are not limited to the particulars shown in the drawings and that the drawings are not necessarily to scale and in some instances proportions may have been exaggerated in order to more clearly depict certain features of the invention.

While particular terminology is used herein, it is to be appreciated that the terminology used herein is for the purpose of describing particular embodiments only and may be changed according to the desire of a user or the practice.

Referring to FIGS. 1 to 4, a brake apparatus includes a master cylinder 20, a sub master cylinder 30, a motor 50, a power transmission member 60, and a hydraulic pressure diversion member 70.

A reservoir 10 stores oil and supplies the oil to the master cylinder 20 and the sub master cylinder 30.

The master cylinder 20 includes disposed therein a first piston 21 and a second piston 22 which are connected in series, and is connected with a second hydraulic line 2 and a third hydraulic line 3.

The sub master cylinder 30 is connected with a brake pedal 40, and is constructed such that a sub piston 31, which is disposed in the sub master cylinder 30, is moved by the actuation force of the brake pedal 40.

The motor 50 and the power transmission member 60 serve as component parts for moving the first piston 21 of the master cylinder 20. In an embodiment, the power transmission member 60 includes a ball screw. The ball screw converts the rotating motion of the motor 50 into linear movement and transmits its kinetic force to the first piston 21.

The hydraulic pressure diversion member 70 diverts the flow of a hydraulic pressure from the sub master cylinder 30 to a pedal simulator 80 or to a first hydraulic line 1 which is connected to the master cylinder 20. In an embodiment, the hydraulic pressure diversion member 70 includes a first valve 71 and a second valve 72.

The first valve 71 diverts the flow of the hydraulic pressure from the sub master cylinder 30 to the pedal simulator 80. The second valve 72 diverts the flow of the hydraulic pressure from the sub master cylinder 30 to the first hydraulic line 1. The first valve 71 is an NC (normally closed) type, and the second valve 72 is an NO (normally opened) type. The first and second valves 71 and 72 may include solenoid valves.

Figure 2:
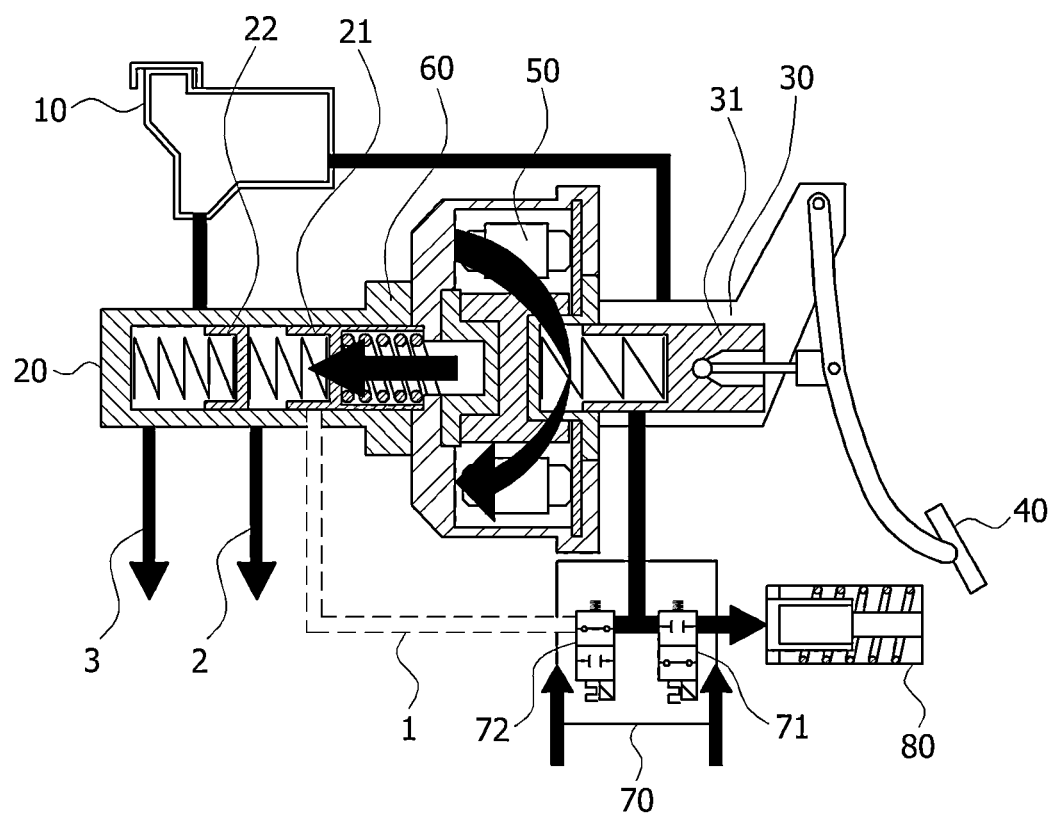
FIG. 2 is a cross-sectional view illustrating the general operation of the brake apparatus in accordance with the embodiment of the present invention.

Referring to FIG. 2, when a driver steps the brake pedal 40, a signal generated by a sensor, such as an angle sensor and a stroke sensor, which is positioned in the vicinity of the brake pedal 40, is transmitted to an ECU (electronic control unit). The ECU outputs a signal for controlling the opening and closing of a valve, to the hydraulic pressure diversion member 70. Accordingly, the first valve 71 in an opened state is closed, and the second valve 72 in a closed state is opened.

The stepping force of the brake pedal 40 that is felt by the driver is created by a reaction force that is generated as the rubber and the spring of the pedal simulator 80 are compressed.

The pedal simulator 80 generates information data for a braking pressure to be applied to wheels, according to the hydraulic pressure transmitted thereto through the second valve 72, and transmits the information data to the ECU. Then, the ECU controls the driving of the motor 50 so that the corresponding braking pressure is applied to the wheels.

The motor 50 is driven under the control of the ECU. The rotating motion of the motor 50 is converted into the linear movement by the ball screw 60, and this kinetic force is transmitted to the first piston 21 of the master cylinder 20. Accordingly, the first piston 21 is actuated, and a hydraulic pressure and a spring reaction force generated by the actuation of the first piston 21 actuate the second piston 22.

The hydraulic pressure generated by the first piston 21 is transmitted via the second hydraulic line 2 to a front left (FL) wheel cylinder and a rear right (RR) wheel cylinder or a front right (FR) wheel cylinder and a rear left (RL) wheel cylinder of the wheels, and forms the braking pressure.

The hydraulic pressure generated by the second piston 22 is transmitted via the third hydraulic line 3 to the front right (FR) wheel cylinder and the rear left (RL) wheel cylinder or the front left (FL) wheel cylinder and the rear right (RR) wheel cylinder of the wheels, and forms the braking pressure.

Figure 3:
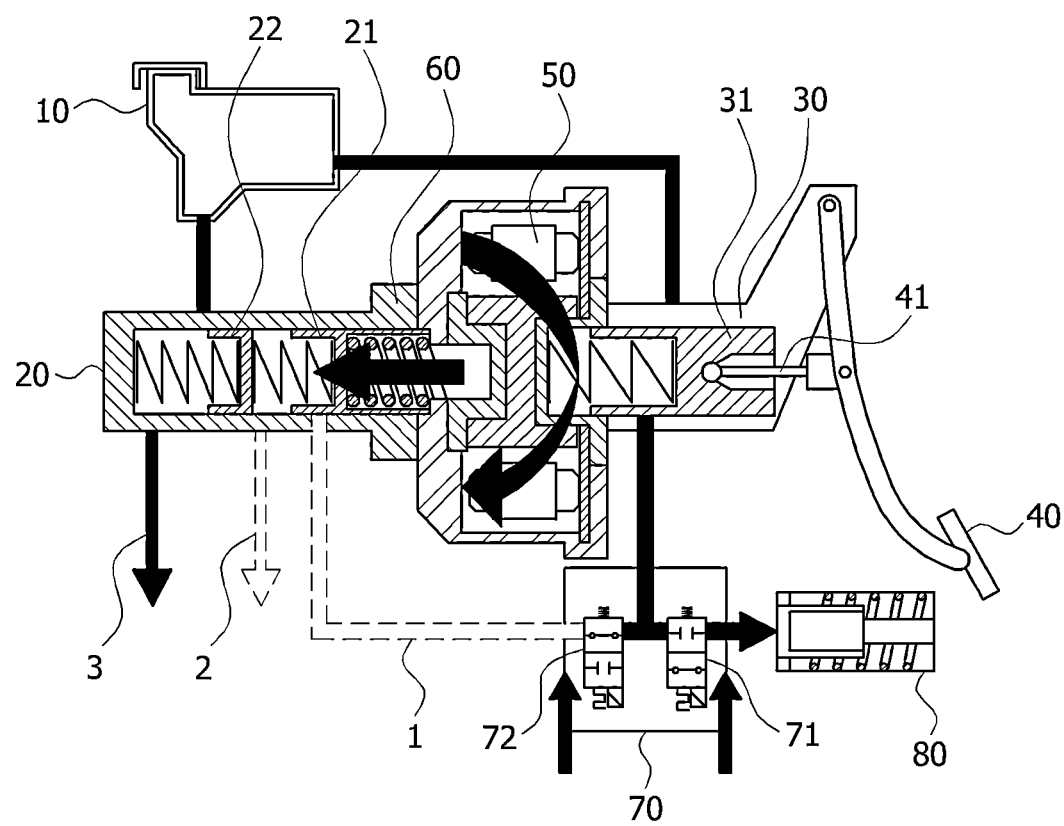
FIG. 3 is a cross-sectional view illustrating the operation of the brake apparatus in accordance with the embodiment of the present invention when a fail of a line has occurred.

In the structure shown in FIG. 3, a pressure is not formed in the second hydraulic line 2 under the influence of a fail in the first hydraulic line 1. However, because the first piston 21 connected to the ball screw 60 is actuated due to driving of the motor 50 and mechanically pushes the second piston 22, a pressure may be effectively formed in the third hydraulic line 3, and accordingly, braking is possible.

Figure 4:
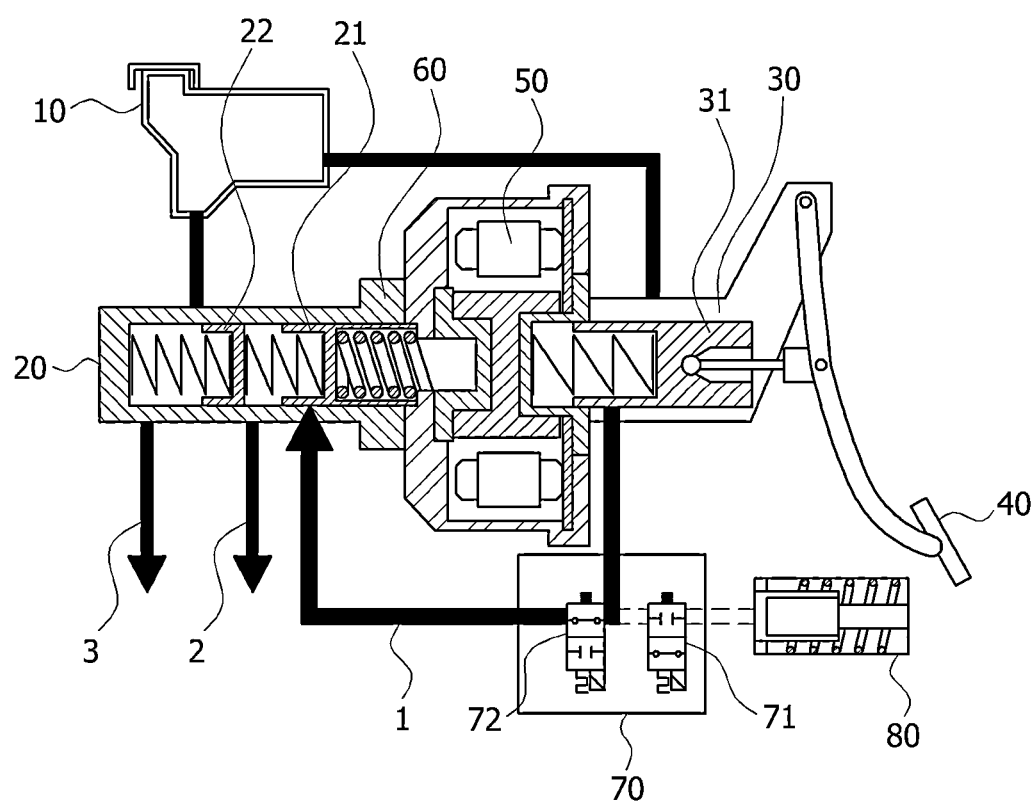
FIG. 4 is a cross-sectional view illustrating the operation of the brake apparatus in accordance with the embodiment of the present invention when a fail of a motor has occurred.

FIG. 4 shows an operation in the case where the motor 50 cannot be driven. As an electrical abnormality occurs in the motor 50, unlike the cases of FIGS. 2 and 3, the first valve 71 is maintained in the closed state as it is and the second valve 72 is maintained in the opened state as it is even when the driver steps the brake pedal 40.

Since the second valve 72 is opened, the hydraulic pressure generated by the sub master cylinder 30 is transmitted to the space between the first piston 21 and the second piston 22. By this hydraulic pressure, a pressure is formed in the second hydraulic line 2, and as the second piston 22 is moved, a pressure is formed in the third hydraulic line 3 as well. According to this fact, braking is possible.

In this regard, if a pressure acting area in the sub master cylinder 30 is reduced, braking of a vehicle becomes possible even though the driver applies, to the brake pedal 40, a pedal actuation force decreased when compared to the conventional art. Hereafter, various embodiments for reducing a pressure acting area in the sub master cylinder 30 and securing a braking force will be described.

Figure 5:
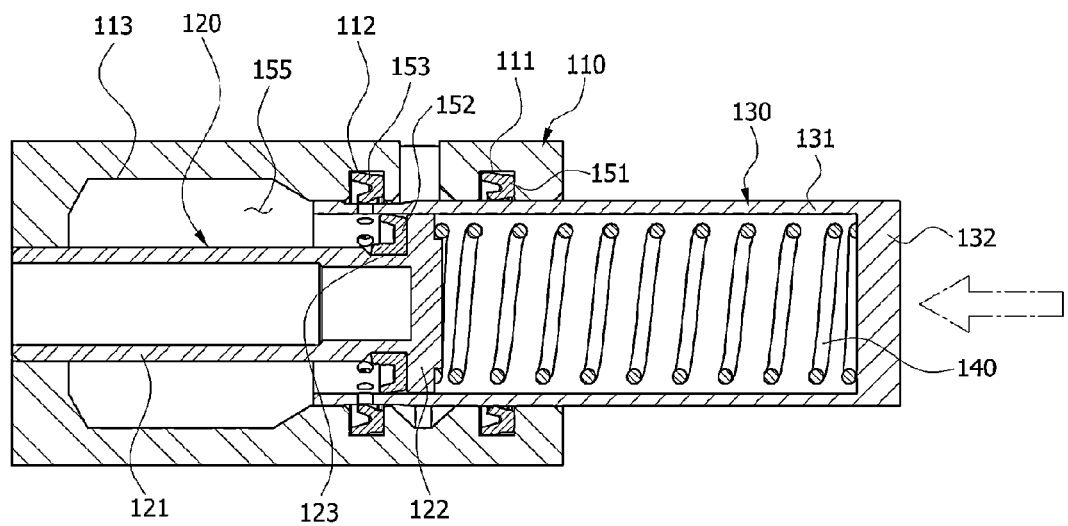
FIG. 5 is a cross-sectional view illustrating the construction of a sub master cylinder in accordance with a first embodiment of the present invention.
Figure 6:
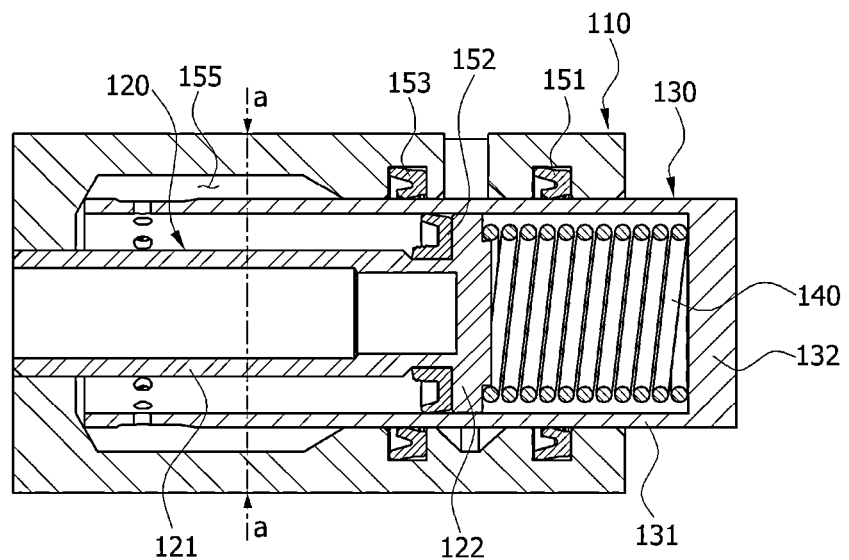
FIG. 6 is a cross-sectional view illustrating the operation of the sub master cylinder in accordance with the first embodiment of the present invention.
Figure 7:
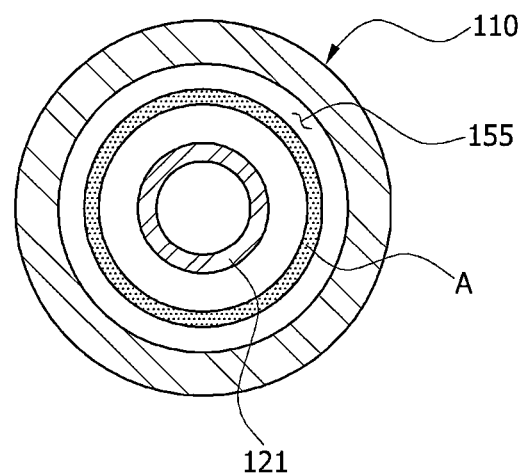
FIG. 7 is a cross-sectional view illustrating a pressure generation area by the sub master cylinder in accordance with the first embodiment of the present invention.

Referring to FIGS. 5 to 7, a sub master cylinder in accordance with a first embodiment of the present invention includes a body 110, a first sub piston 120, a second sub piston 130, and an elastic member 140.

A space 113 is defined in the body 110. The space 113 forms a chamber 155 for storing oil in one part of the body 110.

First cup grooves 111 and 112, in which first seal cups 151 and 153 are received, are defined on the inner surface of the body 110. The first seal cups 151 and 153 are disposed in the other part of the body 110 to be brought into close contact with the outer surface of the second sub piston 130.

According to the present embodiment, the chamber 155 is defined in the one part of the body 110, and the first seal cups 151 and 153 and the first cup grooves 111 and 112 are disposed in the other part of the body 110.

Two first cup grooves 111 and 112 are defined on the inner surface of the body 110, and correspondingly, two first seal cups 151 and 153 are installed.

One end of the first sub piston 120 is secured to one end of the body 110. According to the present embodiment, the first sub piston 120 is secured to the body 110 through press fitting, etc.

The other end of the first sub piston 120 extends toward the other end of the body 110. By this fact, the first sub piston 120 is disposed to extend across the chamber 155.

The first sub piston 120 includes a first cylindrical part 121 and a first disc part 122.

One end of the first cylindrical part 121 is secured to the one end of the body 110. The other end of the first cylindrical part 121 extends toward the other end of the body 110 in such a way as to pass through the chamber 155.

The first disc part 122 projects radially outward at the other end of the first cylindrical part 121. Due to this fact, the circumferential outer surface of the first disc part 122 is positioned close to the inner surface of the second sub piston 130.

A second cup groove 123, in which a second seal cup 152 is received, is defined on the outer surface of the first sub piston 120. The second cup groove 123 is defined at a place where the first cylindrical part 121 and the first disc part 122 are connected with each other.

The second seal cup 152 is received in the second cup groove 123 to be brought into close contact with the inner surface of the second sub piston 130. Due to this fact, it is possible to inhibit the oil stored in the chamber 155 from leaking into the second sub piston 130.

The second sub piston 130 includes a second cylindrical part 131 and a second disc part 132. The second sub piston 130 is formed into a hollow cylindrical shape.

In detail, the second cylindrical part 131 is formed into hollow cylindrical shape, and the second disc part 132 closes the other end of the second cylindrical part 131. The second cylindrical part 131 and the second disc part 132 may be formed integrally with each other.

The second sub piston 130 is disposed between the inner surface of the body 110 and the outer surface of the first sub piston 120. The second sub piston 130 is connected with an actuation rod 41 which is moved when the brake pedal 40 is stepped.

Therefore, when a driver steps the brake pedal 40, the second sub piston 130 is moved by the movement of the actuation rod 41 in a direction in which it is inserted into the chamber 155. That is to say, if the brake pedal 40 is stepped, the second sub piston 130 is moved across the chamber 155 from the position shown in FIG. 5 to the position shown in FIG. 6.

When the second sub piston 130 is moved across the chamber 155, the first seal cups 151 and 153 are brought into close contact with the outer surface of the second sub piston 130, and the second seal cup 152 is brought into close contact with the inner surface of the second sub piston 130.

If the driver steps the brake pedal 40 for braking, the second cylindrical part 131 is moved across the chamber 155 in which the oil is stored. Accordingly, when braking is implemented, a pressure acting area corresponding to the sectional area A (see FIG. 7) of the second cylindrical part 131 is created in the chamber 155.

In this way, as the pressure acting area is created in a shape corresponding to the second cylindrical part 131 which has a hollow cylindrical shape, a pressure acting area AM/cyl. in a master cylinder can be reduced as can be seen from the following equation.

$$F_{clamp} = F_{pedal} \times \text{Pedal Ratio} \times \frac{A_{caliper}}{A_{M/cyl.}}$$

As a consequence, a driver's pedal actuation force Fpedal can be decreased, and a braking force equal to or increased in comparison with the conventional art can be provided. Further, it is possible to solve the problems caused in the conventional art due to deformation of a pedal bracket or a manufacturing cost increase resulting from an increase in weight.

If the driver removes the force applied to the brake pedal 40, the second sub piston 130 maintained in an actuating position as shown in FIG. 6 returns to a standby position as shown in FIG. 5. The return of the second sub piston 130 is carried out by the elastic member 140.

One end of the elastic member 140 is secured to the first disc part 122. The other end of the elastic member 140 is secured to the second disc part 132 which oppositely faces the first disc part 122. By this fact, the elastic member 140 elastically supports the second disc part 132, that is, the second sub piston 130, in the state in which it is secured to the first disc part 122.

By this construction, if the force applied to the brake pedal 40 is removed, the second sub piston 130 is returned to the standby position by the return force of the elastic member 140.

Figure 8:
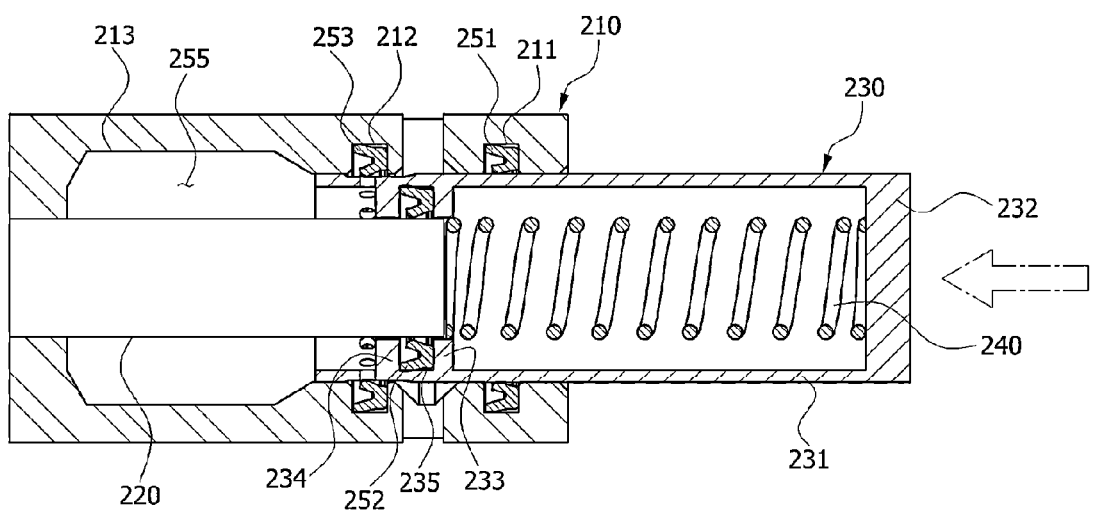
FIG. 8 is a cross-sectional view illustrating the construction of a sub master cylinder in accordance with a second embodiment of the present invention.
Figure 9:
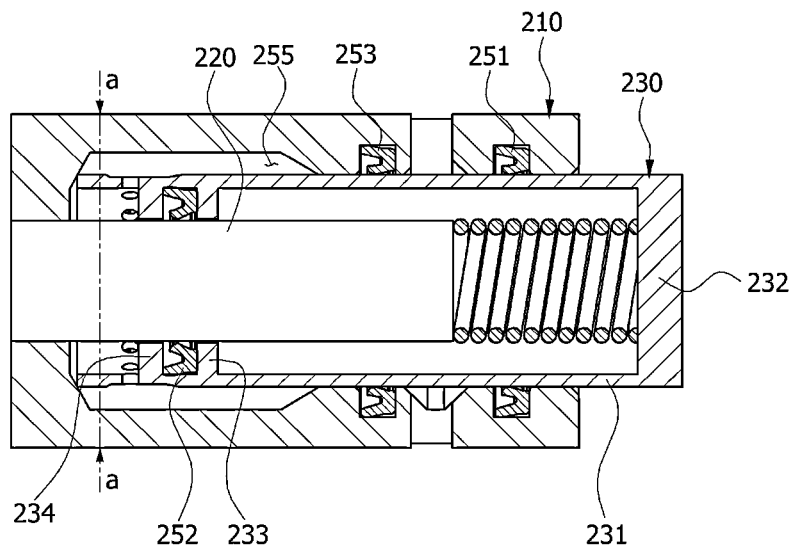
FIG. 9 is a cross-sectional view illustrating the operation of the sub master cylinder in accordance with the second embodiment of the present invention.
Figure 10:
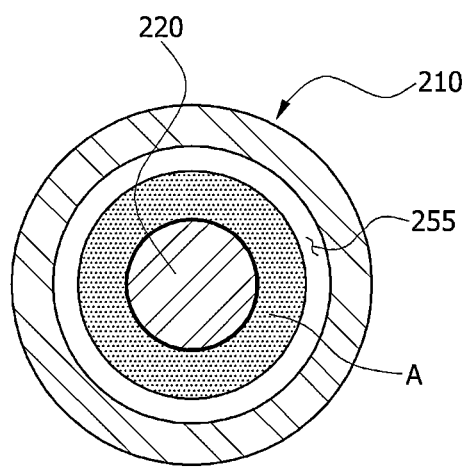
FIG. 10 is a cross-sectional view illustrating a pressure generation area by the sub master cylinder in accordance with the second embodiment of the present invention.

Referring to FIGS. 8 to 10, a sub master cylinder in accordance with a second embodiment of the present invention includes a body 210, a first sub piston 220, a second sub piston 230, and an elastic member 240.

A space 213 is defined in the body 210. The space 213 forms a chamber 255 for storing oil in one part of the body 210.

First cup grooves 211 and 212, in which first seal cups 251 and 253 are received, are defined on the inner surface of the body 210. The first seal cups 251 and 253 are disposed in the other part of the body 210 to be brought into close contact with the outer surface of the second sub piston 230.

According to the present embodiment, the chamber 255 is defined in the one part of the body 210, and the first seal cups 251 and 253 and the first cup grooves 211 and 212 are disposed in the other part of the body 210.

Two first cup grooves 211 and 212 are defined on the inner surface of the body 210, and correspondingly, two first seal cups 251 and 253 are installed.

One end of the first sub piston 220 is secured to one end of the body 210. According to the present embodiment, the first sub piston 220 is secured to the body 210 through press fitting, etc.

The other end of the first sub piston 220 extends toward the other end of the body 210. By this fact, the first sub piston 220 is disposed to extend across the chamber 255.

The second sub piston 230 includes a second cylindrical part 231 and a second disc part 232. The second sub piston 230 is formed into a hollow cylindrical shape.

In detail, the second cylindrical part 231 is formed into a hollow cylindrical shape, and the second disc part 232 closes the other end of the second cylindrical part 231. The second cylindrical part 231 and the second disc part 232 may be formed integrally with each other.

A second cup groove 235, in which a second seal cup 252 is received, is defined on the inner surface of the second cylindrical part 231. A pair of projections 233 and 234 is formed on the inner surface of the second cylindrical part 231 to project toward the first sub piston 220. According to the present embodiment, the pair of projections 233 and 234 defines the second cup groove 235, and is formed to be positioned close to the outer surface of the first sub piston 220.

When the second sub piston 230 is maintained in a standby position as shown in FIG. 8, the second seal cup 252 is arranged between one first seal cup 251 and the other first seal cup 253.

The second seal cup 252 is received in the second cup groove 235 to be brought into close contact with the outer surface of the first sub piston 220. Due to this fact, it is possible to inhibit the oil stored in the chamber 255 from leaking into the second sub piston 230.

The second sub piston 230 is disposed between the inner surface of the body 210 and the outer surface of the first sub piston 220. The second sub piston 230 is connected with the actuation rod 41 which is moved when the brake pedal 40 is stepped.

Therefore, when a driver steps the brake pedal 40, the second sub piston 230 is moved by the movement of the actuation rod 41 in a direction in which it is inserted into the chamber 255. That is to say, if the brake pedal 40 is stepped, the second sub piston 230 is moved across the chamber 255 from the position shown in FIG. 8 to the position shown in FIG. 9.

When the second sub piston 230 is moved across the chamber 255, the first seal cups 251 and 253 are brought into close contact with the outer surface of the second sub piston 230, and the second seal cup 252 is brought into close contact with the outer surface of the first sub piston 220.

If the driver steps the brake pedal 40 for braking, the second cylindrical part 231 and the second seal cup 252 are moved across the chamber 255 in which the oil is stored. Accordingly, when braking is implemented, a pressure acting area corresponding to the sectional area A (see FIG. 10) of the second cylindrical part 231 and the second seal cup 252 is created in the chamber 255.

As a consequence, when compared to the conventional art, a pressure acting area AM/cyl. in a master cylinder can be reduced, and a driver's pedal actuation force Fpedal can be decreased. Moreover, a braking force equal to or increased in comparison with the conventional art can be provided.

Further, it is possible to solve the problems caused in the conventional art due to deformation of a pedal bracket or a manufacturing cost increase resulting from an increase in weight.

If the driver removes the force applied to the brake pedal 40, the second sub piston 230 maintained in an actuating position as shown in FIG. 9 returns to the standby position as shown in FIG. 8. The return of the second sub piston 230 is carried out by the elastic member 240.

One end of the elastic member 240 is secured to the first sub piston 220. The other end of the elastic member 240 is secured to the second disc part 232 which oppositely faces the other end of the first sub piston 220. By this fact, the elastic member 240 elastically supports the second disc part 232, that is, the second sub piston 230, in the state in which it is secured to the first sub piston 220.

By this construction, if the force applied to the brake pedal 40 is removed, the second sub piston 230 is returned to the standby position by the return force of the elastic member 240.

Figure 11:
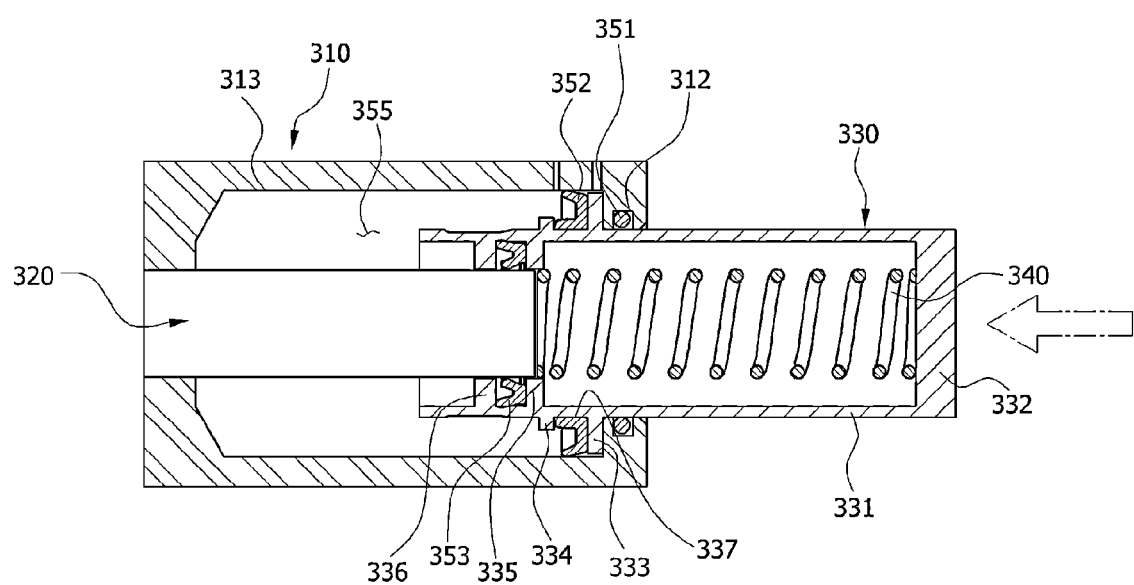
FIG. 11 is a cross-sectional view illustrating the construction of a sub master cylinder in accordance with a third embodiment of the present invention.
Figure 12:
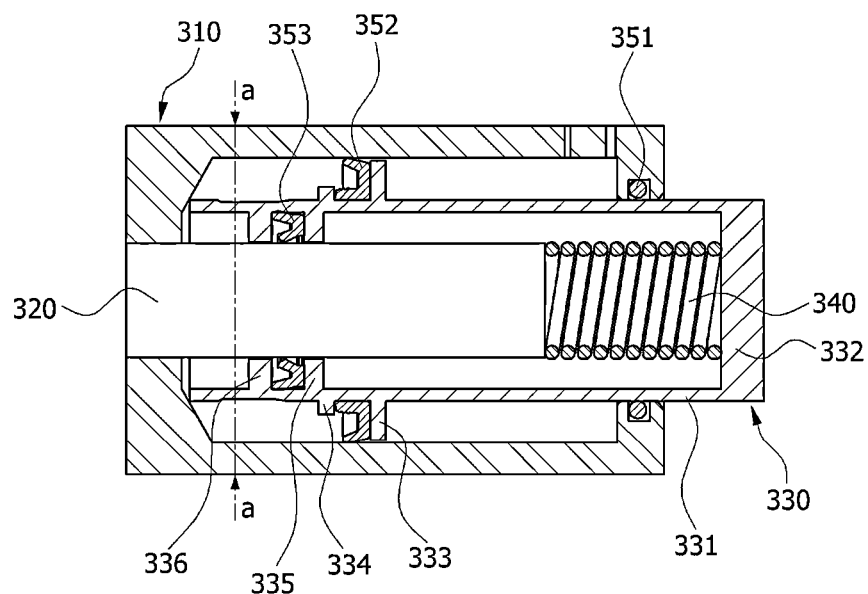
FIG. 12 is a cross-sectional view illustrating the operation of the sub master cylinder in accordance with the third embodiment of the present invention.
Figure 13:
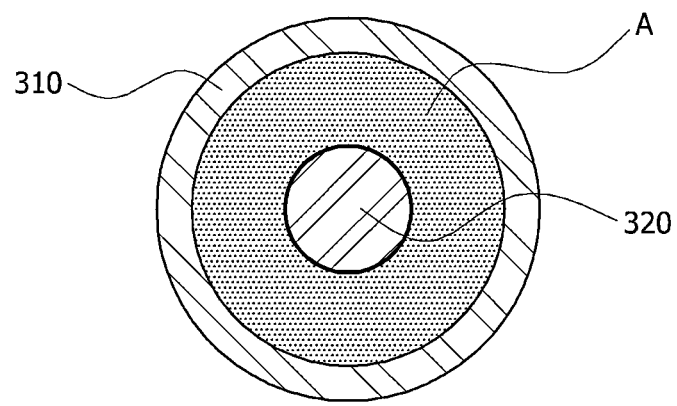
FIG. 13 is a cross-sectional view illustrating a pressure generation area by the sub master cylinder in accordance with the third embodiment of the present invention.

Referring to FIGS. 11 to 13, a sub master cylinder in accordance with a third embodiment of the present invention includes a body 310, a first sub piston 320, a second sub piston 330, and an elastic member 340.

A space 313 is defined in the body 310. The space 313 forms a chamber 355 for storing oil in one part of the body 310.

One end of the first sub piston 320 is secured to one end of the body 310. According to the present embodiment, the first sub piston 320 is secured to the body 310 through press fitting, etc.

The other end of the first sub piston 320 extends toward the other end of the body 310. By this fact, the first sub piston 320 is disposed to extend across the chamber 355.

The second sub piston 330 includes a second cylindrical part 331 and a second disc part 332. The second sub piston 330 is formed into a hollow cylindrical shape.

In detail, the second cylindrical part 331 is formed into a hollow cylindrical shape, and the second disc part 332 closes the other end of the second cylindrical part 331. The second cylindrical part 331 and the second disc part 332 may be formed integrally with each other.

A first cup groove 337 is defined on the outer surface of the second cylindrical part 331. The first cup groove 337 is defined by a pair of projections 333 and 334 which project radially outward from the outer surface of the second cylindrical part 331. A first seal cup 352 is received in the first cup groove 337 and is brought into close contact with the inner surface of the body 310.

An O-ring 312 is installed in the other end of the body 310. By the O-ring 312, airtightness is improved between the inner surface of the body 310 and the outer surface of the second cylindrical part 331.

A second cup groove, in which a second seal cup 353 is received, is defined on the inner surface of the second cylindrical part 331. The second cup groove is defined by a pair of projections 335 and 336 which project toward the first sub piston 320 from the inner surface of the second cylindrical part 331.

The second seal cup 353 is received in the second cup groove to be brought into close contact with the outer surface of the first sub piston 320. Due to this fact, it is possible to inhibit the oil stored in the chamber 355 from leaking into the second sub piston 330. According to the present embodiment, the first seal cup 352 and the second seal cup 353 are seated on the circumferential outer and inner surfaces of the second sub piston 330.

The second sub piston 330 is disposed between the inner surface of the body 310 and the outer surface of the first sub piston 320. The second sub piston 330 is connected with the actuation rod 41 which is moved when the brake pedal 40 is stepped.

Therefore, when a driver steps the brake pedal 40, the second sub piston 330 is moved by the movement of the actuation rod 41 in a direction in which it is inserted into the chamber 355. That is to say, if the brake pedal 40 is stepped, the second sub piston 330 is moved across the chamber 355 from the position shown in FIG. 11 to the position shown in FIG. 12.

When the second sub piston 330 is moved across the chamber 355, the first seal cup 352 is brought into close contact with the inner surface of the body 310, and the second seal cup 353 is brought into close contact with the outer surface of the first sub piston 320.

If the driver steps the brake pedal 40 for braking, the second cylindrical part 331, the first seal cup 352 and the second seal cup 353 are moved across the chamber 355 in which the oil is stored. Accordingly, when braking is implemented, a pressure acting area corresponding to the sectional area A (see FIG. 13) of the second cylindrical part 331, the first seal cup 352 and the second seal cup 353 is created in the chamber 355.

As a consequence, when compared to the conventional art, a pressure acting area AM/cyl. in a master cylinder can be reduced, and a driver's pedal actuation force Fpedal can be decreased. Moreover, a braking force equal to or increased in comparison with the conventional art can be provided.

Further, it is possible to solve the problems caused in the conventional art due to deformation of a pedal bracket or a manufacturing cost increase resulting from an increase in weight.

If the driver removes the force applied to the brake pedal 40, the second sub piston 330 maintained in an actuating position as shown in FIG. 12 returns to a standby position as shown in FIG. 11. The return of the second sub piston 330 is carried out by the elastic member 340.

One end of the elastic member 340 is secured to the first sub piston 320. The other end of the elastic member 340 is secured to the second disc part 332 which oppositely faces the other end of the first sub piston 320. By this fact, the elastic member 340 elastically supports the second disc part 332, that is, the second sub piston 330, in the state in which it is secured to the first sub piston 320.

By this construction, if the force applied to the brake pedal 40 is removed, the second sub piston 330 is returned to the standby position by the return force of the elastic member 340.

Figure 14:
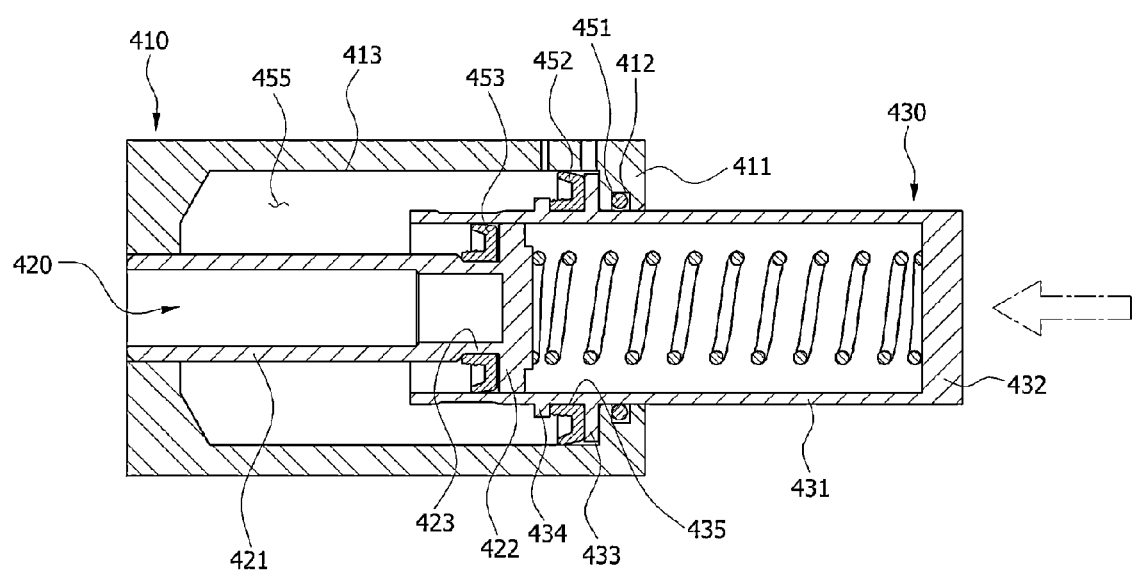
FIG. 14 is a cross-sectional view illustrating the construction of a sub master cylinder in accordance with a fourth embodiment of the present invention.
Figure 15:
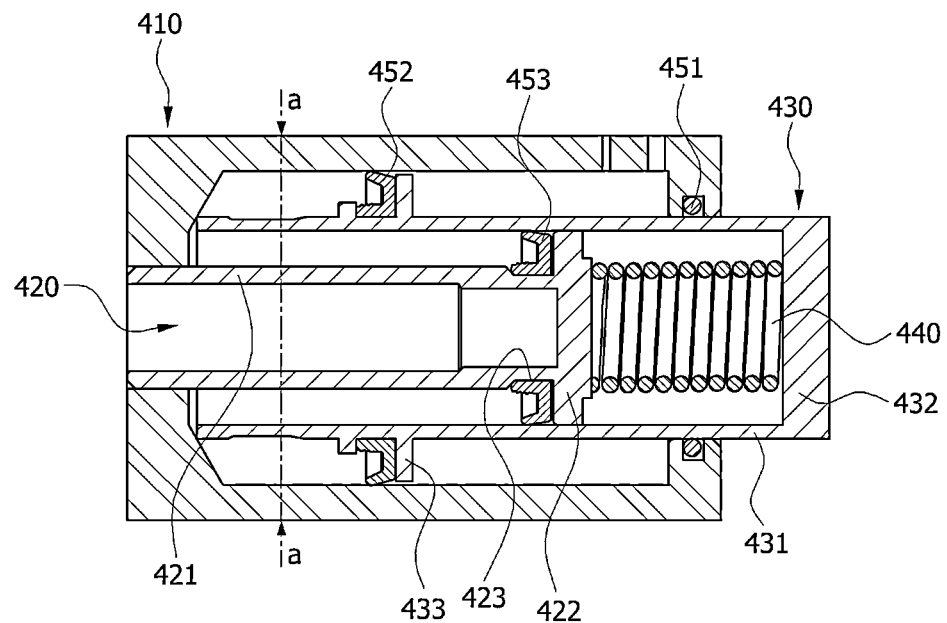
FIG. 15 is a cross-sectional view illustrating the operation of the sub master cylinder in accordance with the fourth embodiment of the present invention.
Figure 16:
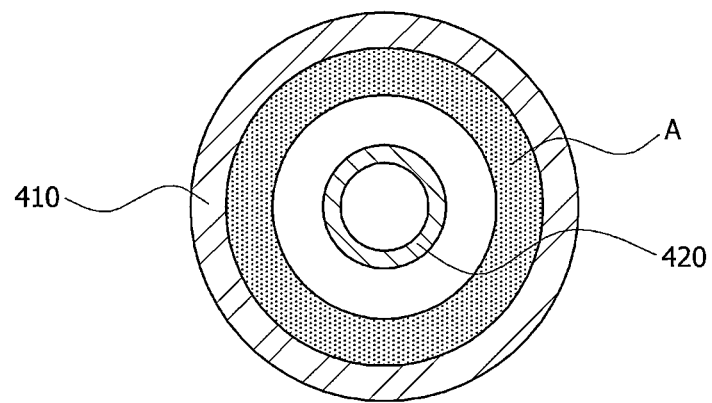
FIG. 16 is a cross-sectional view illustrating a pressure generation area by the sub master cylinder in accordance with the fourth embodiment of the present invention.

Referring to FIGS. 14 to 16, a sub master cylinder in accordance with a fourth embodiment of the present invention includes a body 410, a first sub piston 420, a second sub piston 430, and an elastic member 440.

A space 413 is defined in the body 410. The space 413 forms a chamber 455 for storing oil in one part of the body 410.

One end of the first sub piston 420 is secured to one end of the body 410. According to the present embodiment, the first sub piston 420 is secured to the body 410 through press fitting, etc.

The other end of the first sub piston 420 extends toward the other end of the body 410. By this fact, the first sub piston 420 is disposed to extend across the chamber 455.

The first sub piston 420 includes a first cylindrical part 421 and a first disc part 422.

One end of the first cylindrical part 421 is secured to the one end of the body 410. The other end of the first cylindrical part 421 extends toward the other end of the body 410 in such a way as to pass through the chamber 455.

The first disc part 422 projects radially outward at the other end of the first cylindrical part 421. Due to this fact, the circumferential outer surface of the first disc part 422 is positioned close to the inner surface of the second sub piston 430.

A second cup groove 423, in which a second seal cup 453 is received, is defined on the outer surface of the first sub piston 420. The second cup groove 423 is defined at a place where the first cylindrical part 421 and the first disc part 422 are connected with each other.

The second seal cup 453 is received in the second cup groove 423 to be brought into close contact with the inner surface of the second sub piston 430. Due to this fact, it is possible to inhibit the oil stored in the chamber 455 from leaking into the second sub piston 430.

The second sub piston 430 includes a second cylindrical part 431 and a second disc part 432. The second sub piston 430 is formed into a hollow cylindrical shape.

In detail, the second cylindrical part 431 is formed into a hollow cylindrical shape, and the second disc part 432 closes the other end of the second cylindrical part 431. The second cylindrical part 431 and the second disc part 432 may be formed integrally with each other.

A first cup groove 435 is defined on the outer surface of the second cylindrical part 431. The first cup groove 435 is defined by a pair of projections 433 and 434 which project radially outward from the outer surface of the second cylindrical part 431. A first seal cup 452 is received in the first cup groove 435 and is brought into close contact with the inner surface of the body 410.

An O-ring 412 is installed in the other end of the body 410. By the O-ring 412, airtightness is improved between the inner surface of the body 410 and the outer surface of the second cylindrical part 431.

The second sub piston 430 is disposed between the inner surface of the body 410 and the outer surface of the first sub piston 420. The second sub piston 430 is connected with the actuation rod 41 which is moved when the brake pedal 40 is stepped.

Therefore, when a driver steps the brake pedal 40, the second sub piston 430 is moved by the movement of the actuation rod 41 in a direction in which it is inserted into the chamber 455. That is to say, if the brake pedal 40 is stepped, the second sub piston 430 is moved across the chamber 455 from the position shown in FIG. 14 to the position shown in FIG. 15.

When the second sub piston 430 is moved across the chamber 455, the first seal cup 452 is brought into close contact with the inner surface of the body 410, and the second seal cup 453 is brought into close contact with the inner surface of the second sub piston 420.

If the driver steps the brake pedal 40 for braking, the second cylindrical part 431 and the first seal cup 452 are moved across the chamber 455 in which the oil is stored. Accordingly, when braking is implemented, a pressure acting area corresponding to the sectional area A (see FIG. 16) of the second cylindrical part 431 and the first seal cup 452 is created in the chamber 455.

As a consequence, when compared to the conventional art, a pressure acting area AM/cyl. in a master cylinder can be reduced, and a driver's pedal actuation force Fpedal can be decreased. Moreover, a braking force equal to or increased in comparison with the conventional art can be provided.

Further, it is possible to solve the problems caused in the conventional art due to deformation of a pedal bracket or a manufacturing cost increase resulting from an increase in weight.

If the driver removes the force applied to the brake pedal 40, the second sub piston 430 maintained in an actuating position as shown in FIG. 15 returns to a standby position as shown in FIG. 14. The return of the second sub piston 430 is carried out by the elastic member 440.

One end of the elastic member 440 is secured to the first disc part 422. The other end of the elastic member 440 is secured to the second disc part 432 which oppositely faces the first disc part 422. By this fact, the elastic member 440 elastically supports the second disc part 432, that is, the second sub piston 430, in the state in which it is secured to the first sub piston 420.

By this construction, if the force applied to the brake pedal 40 is removed, the second sub piston 430 is returned to the standby position by the return force of the elastic member 440.

Figure 17:
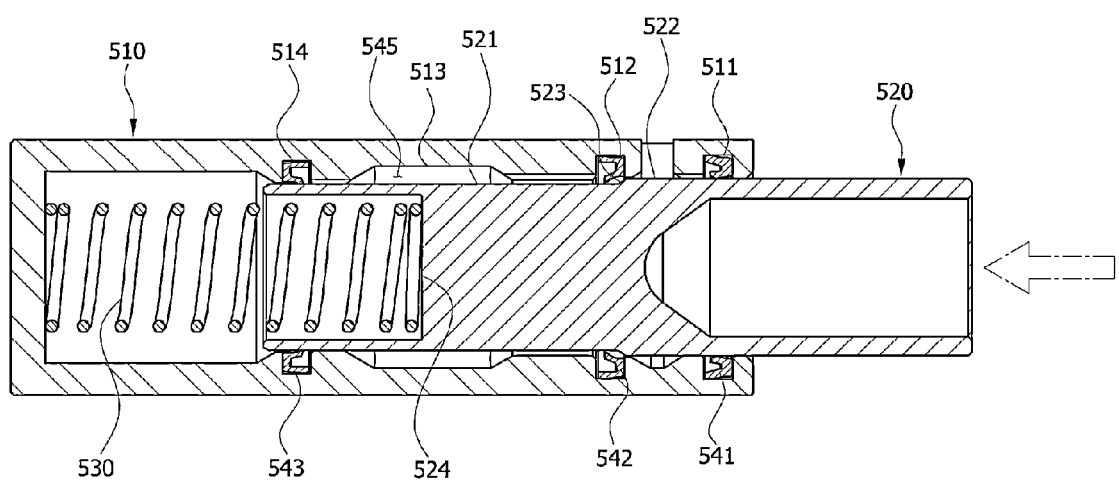
FIG. 17 is a cross-sectional view illustrating the construction of a sub master cylinder in accordance with a fifth embodiment of the present invention.
Figure 18:
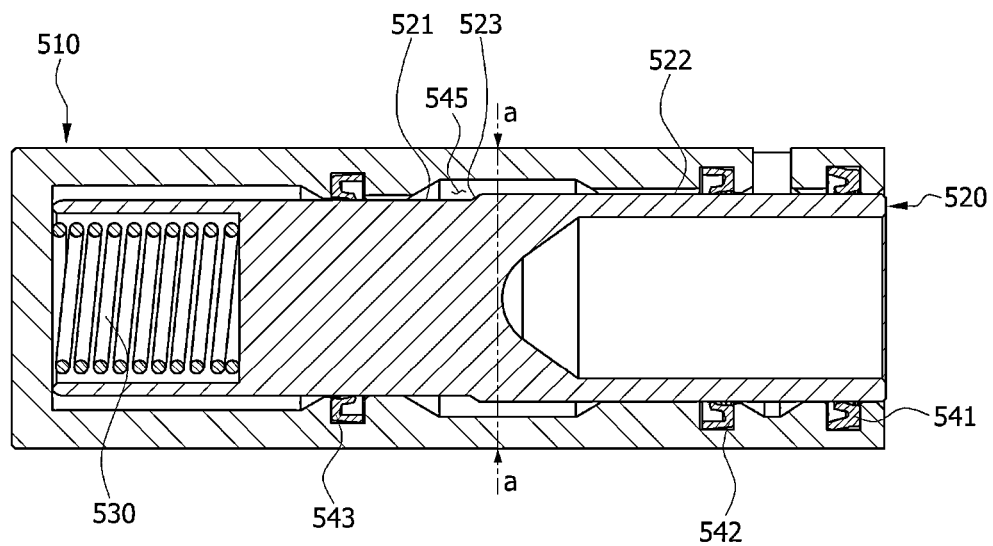
FIG. 18 is a cross-sectional view illustrating the operation of the sub master cylinder in accordance with the fifth embodiment of the present invention.
Figure 19:
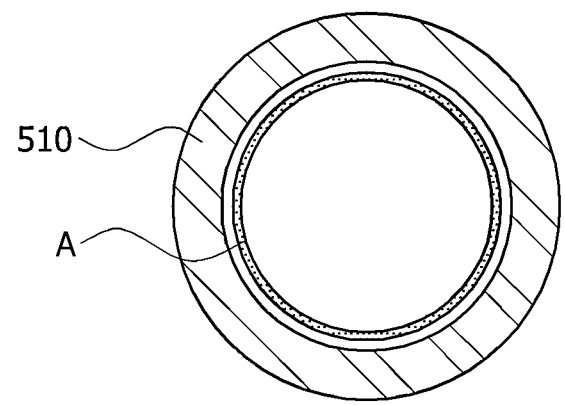
FIG. 19 is a cross-sectional view illustrating a pressure generation area by the sub master cylinder in accordance with the fifth embodiment of the present invention.

Referring to FIGS. 17 to 19, a sub master cylinder in accordance with a fifth embodiment of the present invention includes a body 510, a sub piston 520, and an elastic member 530.

A space 513 is defined in the body 510. The space 513 forms a chamber 545 for storing oil in the body 510.

First cup grooves 511 and 512 are defined on the inner surface of the body 510. First seal cups 541 and 542 are received in the first cup grooves 511 and 512 to be brought into close contact with the outer surface of the sub piston 520.

Two first cup grooves 511 and 512 are defined on the inner surface of the body 510, and correspondingly, two first seal cups 541 and 542 are installed.

A second cup groove 514 is defined on the inner surface of the body 510 in such a way as to be separated from the first cup grooves 511 and 512. A second seal cup 543 is received in the second cup groove 514 to be brought into close contact with the outer surface of the sub piston 520.

According to the present embodiment, the first seal cups 541 and 542 are disposed adjacent to the actuation rod 41, and the second seal cup 543 is disposed adjacent to the elastic member 530, with the chamber 545 defined therebetween.

The sub piston 520 is disposed in the space 513 defined in the body 510 to extend across the chamber 545. The sub piston 520 includes a first cylindrical part 521 and a second cylindrical part 522.

The first cylindrical part 521 is formed into a cylindrical shape, and a mounting groove 524 is defined in one end (the left end in FIG. 17) of the first cylindrical part 521. The second cylindrical part 522 is connected with the other end of the first cylindrical part 521 and has a diameter larger than the first cylindrical part 521.

Since the first cylindrical part 521 and the second cylindrical part 522 have different outer diameters, a step portion 523 is formed at a place where the first cylindrical part 521 and the second cylindrical part 522 are connected with each other. The first cylindrical part 521 and the second cylindrical part 522 may be formed integrally with each other.

The sub piston 520 is connected with the actuation rod 41 which is moved when the brake pedal 40 is stepped.

Therefore, when a driver steps the brake pedal 40, the sub piston 520 is moved across the chamber 545 by the movement of the actuation rod 41 in a direction facing one end of the body 510. Therefore, if the brake pedal 40 is stepped, the sub piston 520 is moved in the chamber 545 from the position shown in FIG. 17 to the position shown in FIG. 18.

When the sub piston 520 is moved in the chamber 545, the first seal cups 541 and 542 are brought into close contact with the outer surface of the second cylindrical part 522, and the second seal cup 543 is brought into close contact with the outer surface of the first cylindrical part 521.

If the driver steps the brake pedal 40 for braking, the second cylindrical part 522 is moved into the chamber 545 in which the oil is stored. Accordingly, when braking is implemented, a pressure acting area corresponding to the difference A (see FIG. 19) between the outer diameters of the second cylindrical part 522 and the first cylindrical part 521 is created in the chamber 545.

In this way, as the sub piston 520 having the two cylindrical parts 521 and 522 with the different outer diameters is moved into the chamber 545, a pressure acting area AM/cyl. in a master cylinder can be reduced when compared to the conventional art.

As a consequence, a driver's pedal actuation force Fpedal can be decreased, and a braking force equal to or increased in comparison with the conventional art can be provided. Further, it is possible to solve the problems caused in the conventional art due to deformation of a pedal bracket or a manufacturing cost increase resulting from an increase in weight.

If the driver removes the force applied to the brake pedal 40, the sub piston 520 maintained in an actuating position as shown in FIG. 18 returns to a standby position as shown in FIG. 17. The return of the sub piston 520 is carried out by the elastic member 530.

One end of the elastic member 530 is secured to the one end of the body 510. The other end of the elastic member 530 is secured to the bottom of the mounting groove 524. By this fact, the elastic member 530 elastically supports the sub piston 520, in the state in which it is secured to the body 510.

By this construction, if the force applied to the brake pedal 40 is removed, the sub piston 520 is returned to the standby position by the return force of the elastic member 530.

Figure 20:
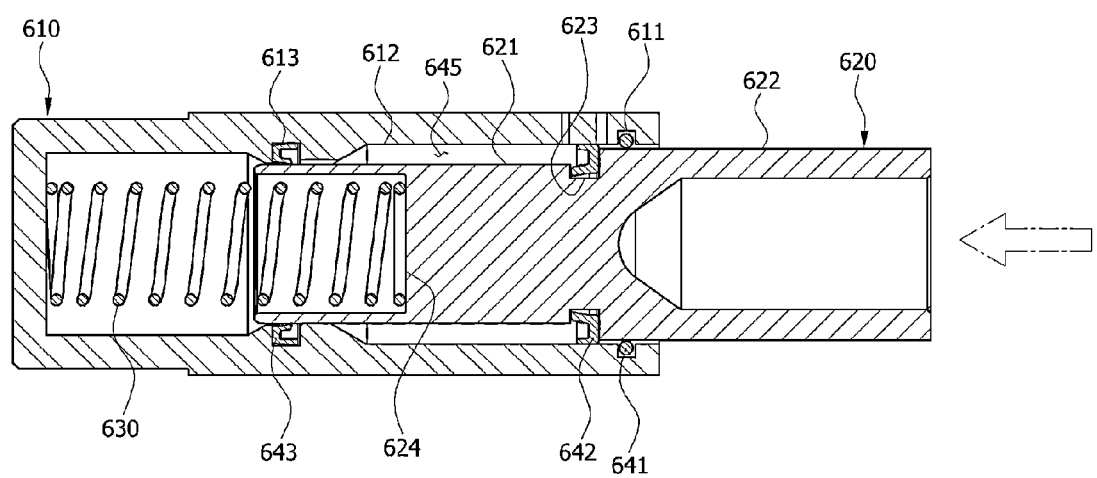
FIG. 20 is a cross-sectional view illustrating the construction of a sub master cylinder in accordance with a sixth embodiment of the present invention.
Figure 21:
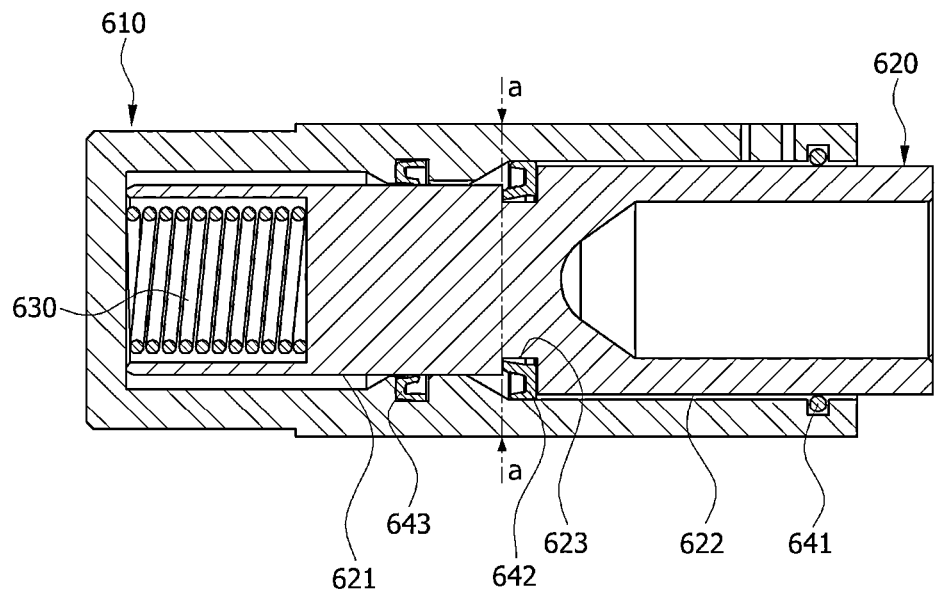
FIG. 21 is a cross-sectional view illustrating the operation of the sub master cylinder in accordance with the sixth embodiment of the present invention.
Figure 22:
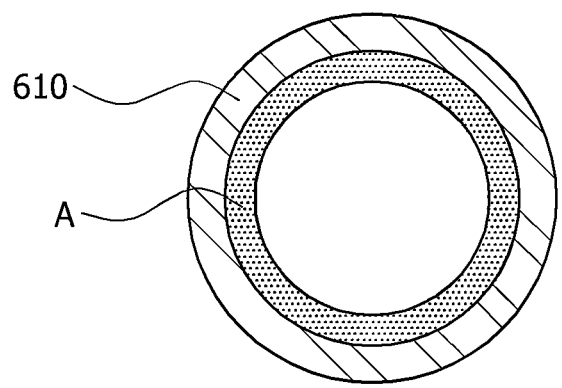
FIG. 22 is a cross-sectional view illustrating a pressure generation area by the sub master cylinder in accordance with the sixth embodiment of the present invention.

Referring to FIGS. 20 to 22, a sub master cylinder in accordance with a sixth embodiment of the present invention includes a body 610, a sub piston 620, and an elastic member 630.

A space 612 is defined in the body 610. The space 612 forms a chamber 645 for storing oil in the body 610.

A second cup groove 613 is defined on the inner surface of the body 610. A second seal cup 643 is received in the second cup groove 613 to be brought into close contact with the outer surface of the sub piston 620.

An O-ring 641 is installed in the other end of the body 610. By the O-ring 641, airtightness is improved between the inner surface of the body 610 and the outer surface of the sub piston 620. The O-ring 641 is received in an O-ring groove 611 which is defined on the inner surface of the other end of the body 610, and is secured therein.

The sub piston 620 is disposed in the space 612 defined in the body 610 to extend across the chamber 645. The sub piston 620 includes a first cylindrical part 621 and a second cylindrical part 622.

The first cylindrical part 621 is formed into a cylindrical shape, and a mounting groove 624 is defined in one end (the left end in FIG. 20) of the first cylindrical part 621. The elastic member 630 is secured to the bottom of the mounting groove 624. The second cylindrical part 622 is connected with the other end of the first cylindrical part 621 and has a diameter larger than the first cylindrical part 621. The first cylindrical part 621 and the second cylindrical part 622 may be formed integrally with each other.

A first cup groove 623 is defined on the outer surface of the sub piston 620. The first cup groove 623 is defined at a place where the first cylindrical part 621 and the second cylindrical part 622 are connected with each other. A first seal cup 642 is received in the first cup groove 623 and is brought into close contact with the inner surface of the body 610.

The sub piston 620 is connected with the actuation rod 41 which is moved when the brake pedal 40 is stepped.

Therefore, when a driver steps the brake pedal 40, the sub piston 620 is moved across the chamber 645 by the movement of the actuation rod 41 in a direction facing one end of the body 610. Therefore, if the brake pedal 40 is stepped, the sub piston 620 is moved in the chamber 645 from the position shown in FIG. 20 to the position shown in FIG. 21.

When the sub piston 620 is moved in the chamber 645, the first seal cup 642 is brought into close contact with the inner surface of the body 610 which defines the chamber 645, and the second seal cup 643 is brought into close contact with the outer surface of the first cylindrical part 621.

If the driver steps the brake pedal 40 for braking, the second cylindrical part 622 is moved into the chamber 645 in which the oil is stored. Accordingly, when braking is implemented, a pressure acting area corresponding to the difference A (see FIG. 22) between the outer diameter of the first seal cup 642 and the outer diameter of the first cylindrical part 621 is created in the chamber 645.

In this way, as the sub piston 620 having the two cylindrical parts 621 and 622 with the different outer diameters is moved into the chamber 645, a pressure acting area AM/cyl. in a master cylinder can be reduced when compared to the conventional art.

As a consequence, a driver's pedal actuation force Fpedal can be decreased, and a braking force equal to or increased in comparison with the conventional art can be provided. Further, it is possible to solve the problems caused in the conventional art due to deformation of a pedal bracket or a manufacturing cost increase resulting from an increase in weight.

If the driver removes the force applied to the brake pedal 40, the sub piston 620 maintained in an actuating position as shown in FIG. 21 returns to a standby position as shown in FIG. 20. The return of the sub piston 620 is carried out by the elastic member 630.

One end of the elastic member 630 is secured to the one end of the body 610. The other end of the elastic member 630 is secured to the bottom of the mounting groove 624. By this fact, the elastic member 630 elastically supports the sub piston 620, in the state in which it is secured to the body 610.

By this construction, if the force applied to the brake pedal 40 is removed, the sub piston 620 is returned to the standby position by the return force of the elastic member 630.

Figure 23:
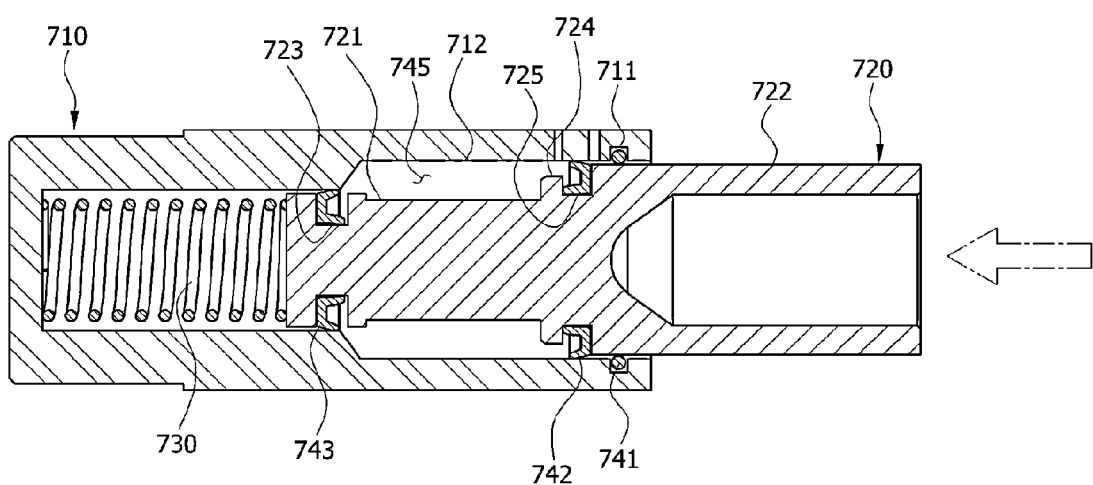
FIG. 23 is a cross-sectional view illustrating the construction of a sub master cylinder in accordance with a seventh embodiment of the present invention.
Figure 24:
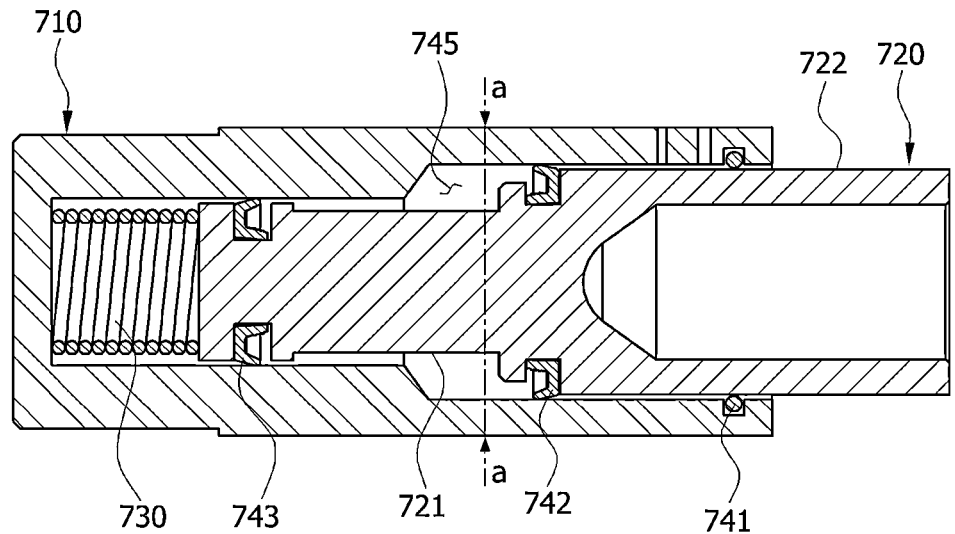
FIG. 24 is a cross-sectional view illustrating the operation of the sub master cylinder in accordance with the seventh embodiment of the present invention.
Figure 25:
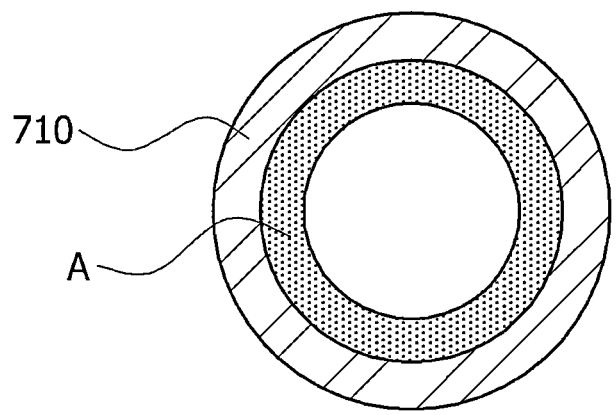
FIG. 25 is a cross-sectional view illustrating a pressure generation area by the sub master cylinder in accordance with the seventh embodiment of the present invention.

Referring to FIGS. 23 to 25, a sub master cylinder in accordance with a seventh embodiment of the present invention includes a body 710, a sub piston 720, and an elastic member 730.

A space 712 is defined in the body 710. The space 712 forms a chamber 745 for storing oil in the body 710.

An O-ring 741 is installed in the other end of the body 710. By the O-ring 741, airtightness is improved between the inner surface of the body 710 and the outer surface of the sub piston 720. The O-ring 741 is received in an O-ring groove 711 which is defined on the inner surface of the other end of the body 710, and is secured therein.

The sub piston 720 is disposed in the space 712 defined in the body 710 to extend across the chamber 745. The sub piston 720 includes a first cylindrical part 721 and a second cylindrical part 722.

The first cylindrical part 721 is formed into a cylindrical shape, and the elastic member 730 is secured to one end of the first cylindrical part 721. The second cylindrical part 722 is connected with the other end of the first cylindrical part 721 and has a diameter larger than the first cylindrical part 721. The first cylindrical part 721 and the second cylindrical part 722 may be formed integrally with each other.

A first cup groove 725 is defined on the outer surface of the sub piston 720. The first cup groove 725 is defined at a place where the first cylindrical part 721 and the second cylindrical part 722 are connected with each other. A first seal cup 742 is received in the first cup groove 725 and is brought into close contact with the inner surface of the body 710. A position fixing projection 724 is formed on the first cylindrical part 721 to project radially outward so as to inhibit the fluctuation of the first seal cup 742.

A second cup groove 723 is defined on the outer surface of the sub piston 720, in detail, on the outer surface of the first cylindrical part 721. The second cup groove 723 is defined adjacent to the one end of the first cylindrical part 721. A second seal cup 743 is received in the second cup groove 723 and is brought into close contact with the inner surface of the body 710.

The sub piston 720 is connected with the actuation rod 41 which is moved when the brake pedal 40 is stepped.

Therefore, when a driver steps the brake pedal 40, the sub piston 720 is moved across the chamber 745 by the movement of the actuation rod 41 in a direction facing one end of the body 710. Therefore, if the brake pedal 40 is stepped, the sub piston 720 is moved in the chamber 745 from the position shown in FIG. 23 to the position shown in FIG. 24.

When the sub piston 720 is moved in the chamber 745, the first seal cup 742 is brought into close contact with the inner surface of the body 710 which defines the chamber 745, and the second seal cup 743 is brought into close contact with the inner surface of the body 710 in the front part (the left part in FIG. 23) of the chamber 745.

If the driver steps the brake pedal 40 for braking, the second cylindrical part 722 is moved into the chamber 745 in which the oil is stored. Accordingly, when braking is implemented, a pressure acting area corresponding to the difference A (see FIG. 25) between the outer diameter of the first seal cup 742 and the outer diameter of the second seal cup 743 is created in the chamber 745.

In this way, as the sub piston 720 having the two cylindrical parts 721 and 722 with the different outer diameters is moved into the chamber 745, a pressure acting area AM/cyl. in a master cylinder can be reduced when compared to the conventional art.

As a consequence, a driver's pedal actuation force Fpedal can be decreased, and a braking force equal to or increased in comparison with the conventional art can be provided. Further, it is possible to solve the problems caused in the conventional art due to deformation of a pedal bracket or a manufacturing cost increase resulting from an increase in weight.

If the driver removes the force applied to the brake pedal 40, the sub piston 720 maintained in an actuating position as shown in FIG. 24 returns to a standby position as shown in FIG. 23. The return of the sub piston 720 is carried out by the elastic member 730.

One end of the elastic member 730 is secured to the one end of the body 710. The other end of the elastic member 730 is secured to one end of the sub piston 720. By this fact, the elastic member 730 elastically supports the sub piston 720, in the state in which it is secured to the body 710.

By this construction, if the force applied to the brake pedal 40 is removed, the sub piston 720 is returned to the standby position by the return force of the elastic member 730.

Figure 26:
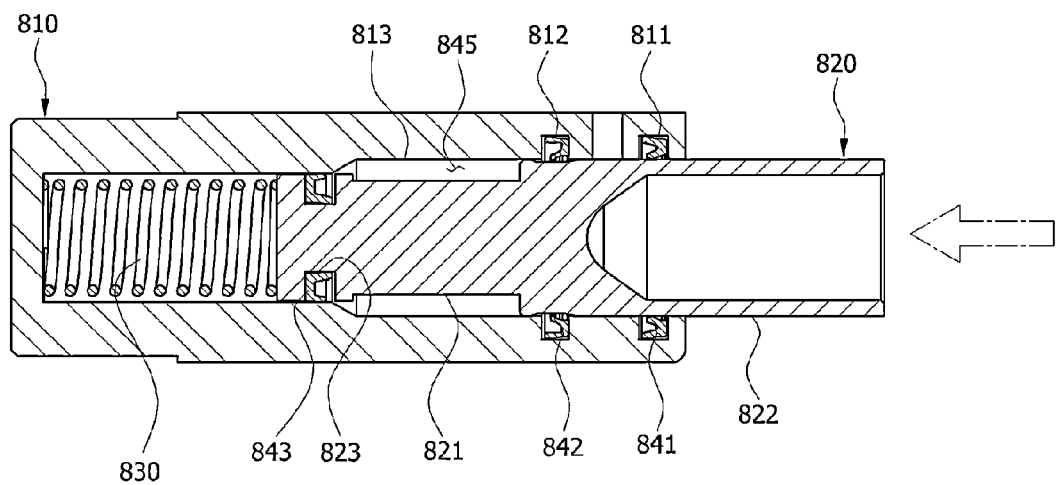
FIG. 26 is a cross-sectional view illustrating the construction of a sub master cylinder in accordance with an eighth embodiment of the present invention.
Figure 27:
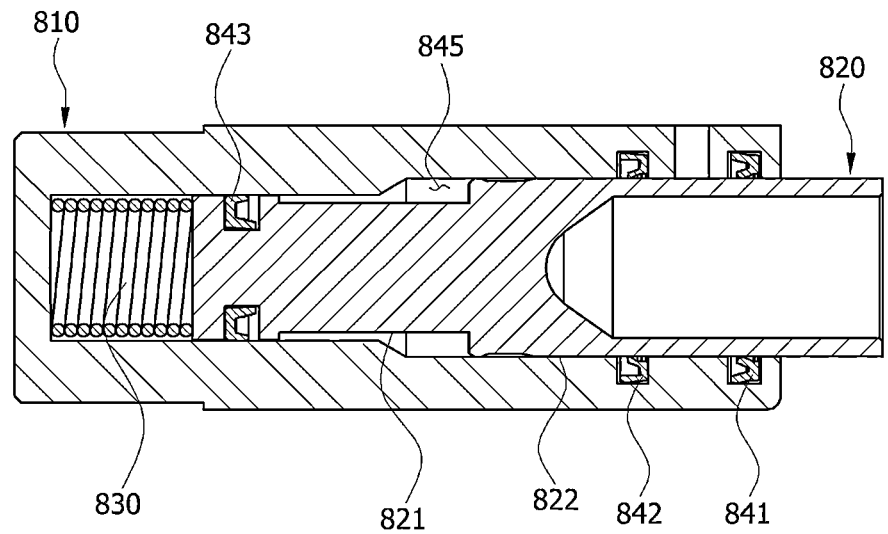
FIG. 27 is a cross-sectional view illustrating the operation of the sub master cylinder in accordance with the eighth embodiment of the present invention.
Figure 28:
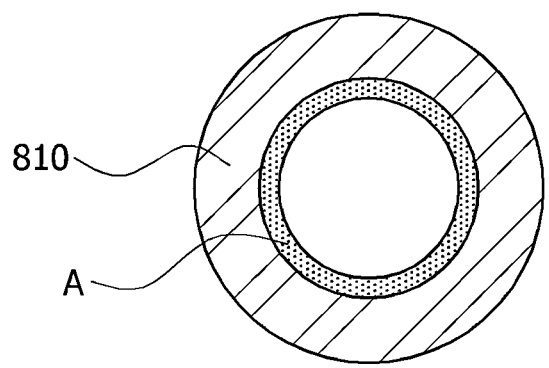
FIG. 28 is a cross-sectional view illustrating a pressure generation area by the sub master cylinder in accordance with the eighth embodiment of the present invention.

Referring to FIGS. 26 to 28, a sub master cylinder in accordance with an eighth embodiment of the present invention includes a body 810, a sub piston 820, and an elastic member 830.

A space 813 is defined in the body 810. The space 813 forms a chamber 845 for storing oil in the body 810.

First cup grooves 811 and 812 are defined on the inner surface of the body 810. First seal cups 841 and 842 are received in the first cup grooves 811 and 812 to be brought into close contact with the outer surface of the sub piston 820. By this fact, airtightness is improved between the inner surface of the body 810 and the outer surface of the sub piston 820.

Two first cup grooves 811 and 812 are defined on the inner surface of the body 810, and correspondingly, two first seal cups 841 and 842 are installed.

The sub piston 820 is disposed in the space 813 defined in the body 810 to extend across the chamber 845. The sub piston 820 includes a first cylindrical part 821 and a second cylindrical part 822.

The first cylindrical part 821 is formed into a cylindrical shape, and the elastic member 830 is secured to one end of the first cylindrical part 821. The second cylindrical part 822 is connected with the other end of the first cylindrical part 821 and has a diameter larger than the first cylindrical part 821. The first cylindrical part 821 and the second cylindrical part 822 may be formed integrally with each other.

A second cup groove 823 is defined on the outer surface of the sub piston 820, in detail, on the outer surface of the first cylindrical part 821. The second cup groove 823 is defined adjacent to the one end of the first cylindrical part 821. A second seal cup 843 is received in the second cup groove 823 and is brought into close contact with the inner surface of the body 810.

The sub piston 820 is connected with the actuation rod 41 which is moved when the brake pedal 40 is stepped.

Therefore, when a driver steps the brake pedal 40, the sub piston 820 is moved across the chamber 845 by the movement of the actuation rod 41 in a direction facing one end of the body 810. Therefore, if the brake pedal 40 is stepped, the sub piston 820 is moved in the chamber 845 from the position shown in FIG. 26 to the position shown in FIG. 27.

When the sub piston 820 is moved in the chamber 845, the first seal cups 841 and 842 are brought into close contact with the outer surface of the second cylindrical part 822, and the second seal cup 843 is brought into close contact with the inner surface of the body 810 in the front part (the left part in FIG. 26) of the chamber 845.

If the driver steps the brake pedal 40 for braking, the second cylindrical part 822 is moved into the chamber 845 in which the oil is stored. Accordingly, when braking is implemented, a pressure acting area corresponding to the difference A (see FIG. 28) between the outer diameters of the first and second cylindrical parts 821 and 822 is created in the chamber 845.

In this way, as the sub piston 820 having the two cylindrical parts 821 and 822 with the different outer diameters is moved into the chamber 845, a pressure acting area AM/cyl. in a master cylinder can be reduced when compared to the conventional art.

As a consequence, a driver's pedal actuation force Fpedal can be decreased, and a braking force equal to or increased in comparison with the conventional art can be provided. Further, it is possible to solve the problems caused in the conventional art due to deformation of a pedal bracket or a manufacturing cost increase resulting from an increase in weight.

If the driver removes the force applied to the brake pedal 40, the sub piston 820 maintained in an actuating position as shown in FIG. 27 returns to a standby position as shown in FIG. 26. The return of the sub piston 820 is carried out by the elastic member 830.

One end of the elastic member 830 is secured to the one end of the body 810. The other end of the elastic member 830 is secured to one end of the sub piston 820. By this fact, the elastic member 830 elastically supports the sub piston 820, in the state in which it is secured to the body 810.

By this construction, if the force applied to the brake pedal 40 is removed, the sub piston 820 is returned to the standby position by the return force of the elastic member 830.

As is apparent from the above descriptions, according to the embodiments of the present invention, since a pressure acting area in a master cylinder is reduced, a driver's pedal actuation force can be decreased, and a braking force equal to or increased in comparison with the conventional art can be provided.

Also, according to the embodiments of the present invention, it is possible to solve the problems caused in the conventional art due to deformation of a pedal bracket or a manufacturing cost increase resulting from an increase in weight.

Further, according to the embodiments of the present invention, space utilization efficiency of a vehicle can be improved since the overall length of the vehicle can be shortened and thus a space for an engine room can be secured.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A sub master cylinder comprising:
a body formed with a chamber in which oil is stored;
a first sub piston having one end fixedly attached to one end of the body and the other end which extends toward the other end of the body and is disposed to cross the chamber; and
a second sub piston vertically disposed between the body and the first sub piston, wherein a portion of an outer surface of the second sub piston is vertically disposed between an inner surface of the body and an outer surface of the first sub piston to be moved in the chamber;
wherein the first sub piston comprises:
a first cylindrical part having one end fixedly attached to the one end of the body and another end disposed to pass through the chamber; and
a first disc part projecting radially outward at the another end of the first cylindrical part,
wherein a diameter of the first disc part is greater than an outer diameter of the first cylindrical part,
wherein the first disc part of the first sub piston is disposed in an interior space of the second sub piston and the first disc part directly contacts an elastic member disposed in the interior space of the second sub piston to press against the elastic member,
wherein the second sub piston is formed into a hollow cylindrical shape,
wherein a first cup groove, in which a first seal cup is received, is defined on the inner surface of the body;
wherein a second cup groove, in which a second seal cup is received, is defined on the outer surface of the first sub piston; and
wherein, in a state in which the first seal cup is brought into close contact with an outer surface of the second sub piston and the second seal cup is brought into close contact with an inner surface of the second sub piston, the second sub piston is moved in the chamber.

2. The sub master cylinder according to claim 1,
wherein the second cup groove is defined at a place where the first cylindrical part and the first disc part are connected with each other.

3. The sub master cylinder according to claim 2,
wherein the elastic member has one end secured to the first disc part and the other end elastically supporting the second sub piston to return the second sub piston to a standby position when a force stepping a pedal is removed.

4. A sub master cylinder comprising:
a body formed with a chamber in which oil is stored; and
a sub piston disposed in the body to cross the chamber and be moved in the chamber, the sub piston comprising:
a first cylindrical part formed in a cylindrical shape, having one end fixedly attached to one end of the body; and
a second cylindrical part connected with one end of the first cylindrical part,
wherein an outer diameter of the second cylindrical part is greater than an outer diameter of the first cylindrical part,
wherein the first cylindrical part and the second cylindrical part are integrally formed with each other,
wherein a distal end of the first cylindrical part directly contacts an elastic member disposed in an interior space of the second cylindrical part to press against the elastic member,
wherein a step portion is formed at a place where the first cylindrical part and the second cylindrical part are connected with each other;
wherein a first cup groove, in which a first seal cup is received, is defined on an inner surface of the body, and a second cup groove, in which a second seal cup is received, is defined on the inner surface of the body to be separated from the first cup groove; and
wherein, in a state in which the first seal cup is brought into close contact with an outer surface of the second cylindrical part and the second seal cup is brought into close contact with an outer surface of the first cylindrical part, the sub piston is moved in the chamber.

5. The sub master cylinder according to claim 4, further comprising:
an elastic member having one end which is secured to one end of the body and the other end which elastically supports the sub piston to return the sub piston to a standby position when a force stepping a pedal is removed.

6. A brake apparatus comprising:
a sub master cylinder including a body formed with a chamber in which oil is stored, and a sub piston disposed in the body to cross the chamber and be moved in the chamber, the sub piston including a first cylindrical part formed in a cylindrical shape and having one end fixedly attached to one end of the body, and a second cylindrical part connected with one end of the first cylindrical part;
a master cylinder in which a first piston and a second piston are connected in series, wherein, in order to brake wheels, a hydraulic pressure is generated as the first piston is moved, and a hydraulic pressure is generated as the second piston is moved by the movement of the first piston or a hydraulic pressure is generated as the second piston is moved by a hydraulic pressure transmitted through a hydraulic line; and
a hydraulic pressure diversion member configured to divert flow of a hydraulic pressure from the sub master cylinder to a pedal simulator or to the hydraulic line which is connected to the master cylinder, wherein an outer diameter of the second cylindrical part is greater than an outer diameter of the first cylindrical part, wherein the first cylindrical part and the second cylindrical part are integrally formed with each other, wherein a distal end of the first cylindrical part directly contacts an elastic member disposed in an interior space of the second cylindrical part to press against the elastic member, wherein a step portion is formed at a place where the first cylindrical part and the second cylindrical part are connected with each other;

wherein a first cup groove, in which a first seal cup is received, is defined on an inner surface of the body, and a second cup groove, in which a second seal cup is received, is defined on the inner surface of the body to be separated from the first cup groove; and wherein, in a state in which the first seal cup is brought into close contact with an outer surface of the second cylindrical part and the second seal cup is brought into close contact with an outer surface of the first cylindrical part, the sub piston is moved in the chamber.

* * * * *